("12") United States Patent
Milner et al.

(10) Patent No.: US 10,201,052 B1
(45) Date of Patent: Feb. 5, 2019

(54) LED DIMMING

(71) Applicant: Linear Technology Holding, LLC, Norwood, MA (US)

(72) Inventors: Lucas Andrew Milner, San Jose, CA (US); Joshua William Caldwell, Los Gatos, CA (US)

(73) Assignee: Linear Technology Holding, LLC, Norwood, MA (US)

( * ) Notice: Subject to any disclaimer, the term of this patent is extended or adjusted under 35 U.S.C. 154(b) by 0 days.

(21) Appl. No.: 15/712,839

(22) Filed: Sep. 22, 2017

(51) Int. Cl.
*H05B 37/02* (2006.01)
*H05B 33/08* (2006.01)
*H02M 3/157* (2006.01)
*H02M 3/158* (2006.01)

(52) U.S. Cl.
CPC ........ *H05B 33/0845* (2013.01); *H02M 3/157* (2013.01); *H02M 3/1588* (2013.01); *H05B 33/0815* (2013.01); *H05B 33/0818* (2013.01); *H05B 33/0851* (2013.01)

(58) Field of Classification Search
CPC ............ H05B 33/0815; H05B 33/0845; H05B 33/0851; H05B 33/0842; H05B 33/0848; H05B 33/0887; H05B 33/0809; H05B 33/0821; H05B 33/0824; H05B 41/3927; H02M 3/1582; H02M 3/1588; H02M 3/156; H02M 3/157; Y02B 20/346
See application file for complete search history.

(56) References Cited

U.S. PATENT DOCUMENTS

| 5,189,419 | A | 2/1993 | Lyden | |
|---|---|---|---|---|
| 6,646,848 | B2 * | 11/2003 | Yoshida | H02M 1/32 361/93.5 |
| 7,276,863 | B2 * | 10/2007 | Lee | G09G 3/342 315/307 |
| 7,511,437 | B2 * | 3/2009 | Lys | H02M 1/4225 315/224 |
| 7,518,525 | B2 * | 4/2009 | Chou | H05B 33/0815 315/291 |
| 7,710,084 | B1 | 5/2010 | Guo | |
| 8,058,810 | B2 * | 11/2011 | Chen | H05B 33/0827 315/209 R |
| 8,179,110 | B2 * | 5/2012 | Melanson | H02M 3/156 323/282 |

(Continued)

OTHER PUBLICATIONS

"U.S. Appl. No. 15/712,779, Non Final Office Action dated Feb. 16, 2018", 6 pgs.

(Continued)

*Primary Examiner* — Vibol Tan
(74) *Attorney, Agent, or Firm* — Schwegman Lundberg & Woessner, P.A.

(57) ABSTRACT

Techniques are provided for low, or deep, dimming of a light-emitting diode (LED) load. In an example, a low dimming circuit can include a target current detector configured to provide an output indicative of a target current of a power stage of a pulse width modulated driver, and a control circuit configured to receive a PWM signal of the PWM LED driver, to control a first transition to a first state of a power switch of the power stage during an on-interval of a first PWM cycle of the PWM signal, and to control a second transition to the first state of the power switch using the output of the target current detector during an off interval of the first PWM cycle.

24 Claims, 9 Drawing Sheets

(56) References Cited

U.S. PATENT DOCUMENTS

| | | | |
|---|---|---|---|
| 8,294,388 B2* | 10/2012 | Wong | H05B 33/0815 |
| | | | 315/247 |
| 8,456,106 B2 | 1/2013 | Mednik et al. | |
| 8,710,819 B2 | 4/2014 | Chen | |
| 8,810,157 B2 | 8/2014 | Del Carmen, Jr. | |
| 8,975,831 B1* | 3/2015 | Szolusha | H05B 33/0851 |
| | | | 315/291 |
| 9,072,147 B2* | 6/2015 | Szolusha | H05B 33/0851 |
| 9,167,647 B1* | 10/2015 | Takekawa | H05B 33/0845 |
| 9,178,427 B1* | 11/2015 | Szolusha | H02M 3/1588 |
| 9,577,530 B1* | 2/2017 | Ribarich | H02M 3/158 |
| 9,681,507 B2* | 6/2017 | Lys | H05B 33/0815 |
| 9,706,615 B2* | 7/2017 | Seki | H05B 33/0815 |
| 9,750,113 B2* | 8/2017 | Nozawa | H05B 37/0254 |
| 9,814,115 B2* | 11/2017 | Kido | H05B 33/089 |
| 2015/0312980 A1 | 10/2015 | Hu et al. | |

OTHER PUBLICATIONS

"U.S. Appl. No. 15/726,154, Examiner Interview Summary dated Apr. 12, 2018", 2 pgs.

"U.S. Appl. No. 15/726,154, Non Final Office Action dated Jan. 10, 2018", 8 pgs.

"U.S. Appl. No. 15/726,154, Response filed Apr. 10, 2018 to Non Final Office Action dated Jan. 10, 2018", 8 pgs.

"U.S. Appl. No. 15/712,779, Response filed May 15, 2018 to Non Final Office Action dated Feb. 16, 2018", 8 pgs.

"U.S. Appl. No. 15/712,779, Corrected Notice of Allowability dated Jul. 17, 2018", 2 pgs.

"U.S. Appl. No. 15/712,779, Notice of Allowance dated Jul. 6, 2018", 8 pgs.

"U.S. Appl. No. 15/726,154, Notice of Allowance dated Jul. 23, 2018", 9 pgs.

\* cited by examiner

LED DIMMING

TECHNICAL FIELD

This application applies to techniques for LED lighting, including deep dimming of LED lighting.

BACKGROUND

Light emitting diode (LED) technology has progressed from providing small visual indicators of electronic operation to becoming a technology applicable to a variety of general lighting applications, including applications for residential, commercial, and outdoor lighting. In general lighting applications, LEDs may perform at or better than prior lighting solutions using a fraction of the energy consumption. However, techniques for efficient dimming of LED lighting to very low dimming settings have been elusive.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain methods of dimming lighting systems by switched-mode DC power regulation can also be applied to LED lighting systems. However, as the dimming set point is lowered, some methods may become inefficient, may result in undesired flicker of the LED or may result in the LED appearing to be off as the dimming set point becomes lower. A switching regulator circuit can be used to provide electrical power, combined with a pulse width modulated (PWM) control switch to deliver the power provided by the switching regulator circuit to one or more LEDs. This can provide efficient dimming of an LED-down to a certain level. In an inductive switching regulator circuit, an inductor can be used as an energy storage element that can be connected and disconnected by a regulator switch, at a regulator switching frequency, with a supply voltage. The inductor can be used to supply current for use by the LED. A PWM switch can be used to connect and disconnect the one or more LEDs with a node that can be coupled to the output of the switching regulator circuit.

In one approach, the switching regulator circuit is enabled and disabled together with the cycling of the PWM switch. In general, the switching frequency of the regulator is much higher than the PWM frequency, which allows for a wide range of dimming control over the LED.

However, when the on-time, or duty cycle, of the PWM controller becomes lower, current control of the LED system can be lost, along with the ability to further dim the LEDs because the on-time of the PWM controller fails to allow transfer of sufficient charge to an intermediate node for use by the LEDs. When current control is lost, such as due to a short duty cycle of the PWM switch cycle, the LEDs can appear to be off, or not energized. In some situations, current error can accumulate when the dimming level is very low. Then, upon receiving a higher dimming set point, the actual dimming can be too high while the control loop handles the accumulated error.

The present inventors have developed techniques that can allow deep dimming in LED systems using PWM control along with an inductive switching regulator, without losing current control or causing flicker of the LED lights. In a first technique ("extended charge transfer dimming"), if, during a first switching cycle of the regulator, inductor current does not reach a target current before the PWM on-time expires, connection of the inductor to a voltage source can be maintained until the target current is reached. In a second technique ("supplemental charge transfer dimming"), if, during a first switching cycle of the regulator, inductor current does not reach a target current before the PWM on-time expires, a second or fractional switching cycle of the inductor can be enabled during the PWM off-time. These two techniques can be used separately, or in combination with each other.

Figure 1:
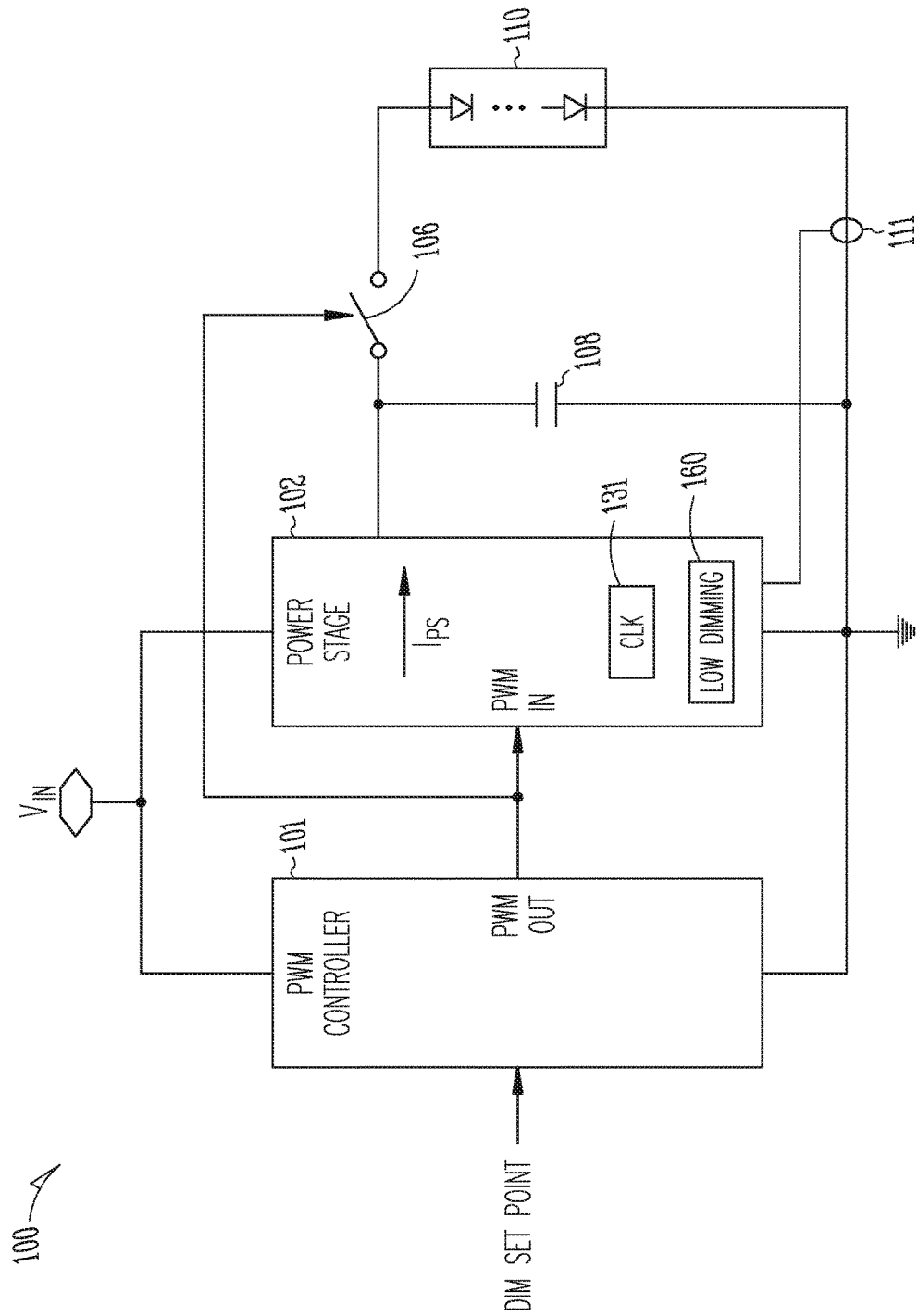
FIG. 1 illustrates generally a block diagram of an example of a system that can be used for extended charge transfer or supplemental charge transfer dimming of one or more LEDs.

FIG. 1 illustrates generally an example of an LED driver system 100. The system 100 can include a controller circuit, such as a PWM controller 101, a power stage 102 circuit, a PWM switch 106, an output capacitor 108, and a current sensor 111, and can include or be coupled to an LED load 110. The PWM controller 101 can receive an LED dimming set point. The PWM controller 101 can provide a PWM signal having a duty cycle or "on" time that can be adjusted to correspond to the dimming set point. The power stage 102 can receive the PWM signal and a power supply voltage ($V_{IN}$). The power stage 102 can include a switched mode or other power regulator, such as can include one or more switches. The power stage switches can be clocked, such as to regulate an output current or voltage ($V_{OUT}$) of the power stage 102, such as to provide a bias voltage and bias current to the LED load 110, such that an average current provided to the LED load 100 can be established to be commensurate with the dimming set point. The switching regulator of the power stage 102 can include or be coupled to a clock (CLK) 131. The clock 131 can provide a clock signal to the switching regulator that can be used to provide output current of the power stage ($I_{PS}$) that can be regulated using a target value of a peak current in the switching regulator. For longer PWM "on" times, the PWM switch 106 can provide substantial control of the average current to the LED load 110. The output capacitor 108 can smooth the output voltage of the power stage 102, and can provide energy storage in cooperation with a low dimming circuit 160 of the power stage 102, such as to allow for very low dimming of the LED load 110 while avoiding flicker. The current sensor 111 can be used by the power stage 102 to set the target value of the peak current, such as explained herein.

Figure 2:
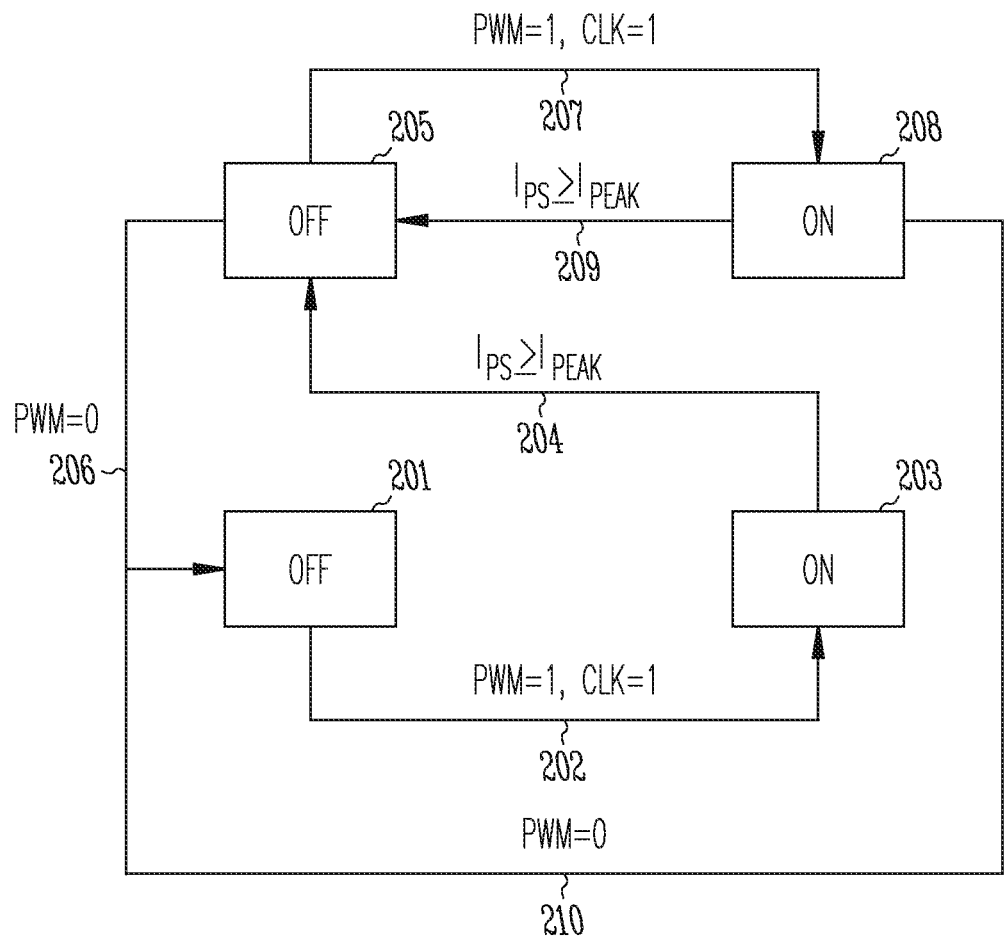
FIG. 2 illustrates generally a state diagram of an example of a method of extended charge transfer.

FIG. 2 illustrates generally a state diagram 200 of an example method of extended charge transfer. The method can be explained beginning at a first "off" state 201 of a power stage switch of the switching regulator circuit of the power stage 102. Upon receiving a PWM input transition to an "on" time of a PWM cycle (PWM=1) controlling the switch (FIG. 1, 106) to the LEDs, clocking of the power stage switch (e.g., FIG. 3, 303) of the switching regulator circuit can begin, such as indicated in FIG. 2 by a first transition 202 to a first "on" state 203 of the power stage switch. In this "on" state 203, the power stage switch can be closed or energizing, for example, an inductor of the power stage. In certain examples, the power stage can include a buck converter circuit, a boost converter circuit, a buck-boost converter circuit, or other switched mode power converter.

During the first "on" state 203, the power stage can begin to supply charge to the capacitor 108 at an intermediate node of an LED circuit, which, in turn, can be used to feed the PWM switch 106 to the LED load 110. Power stage current ($I_{PS}$) can supply the output capacitor 108 and, when the PWM switch 106 is "on", can also supply the LED load 110. From a zero current value in the first "off" state 201 of the power stage switch, upon transition to the first "on" state 203, the power stage current ($I_{PS}$) increases. The first "on" state 203 can be continued until a target current threshold ($I_{PEAK}$) has been satisfied-regardless of whether the PWM cycle "on" time has expired or not.

When the actual current flow ($I_{PS}$) of the power stage 102 has satisfied the current threshold ($I_{PEAK}$), such condition can trigger a second transition 204 to a second "off" state 205 of the power stage switch. During the second "off" state 205 of the power stage switch, a power supply path to the power stage 102 can be interrupted. However, energy stored in an inductor of the switching regulator of the power stage 102 may still supply (decreasing) current to the output capacitor 108 and, when the PWM switch 106 is "on", to the LED load 110.

A third transition 206 out of the second "off" state 205 of the power stage switch, can return operation to the first "off" state 201, such as when the PWM input indicates an "off" time of the PWM cycle (PWM=0). Alternatively, exit from the second "off" state 205 can follow a fourth transition 207 to a second "on" state 208 of the power stage switch, such as when the PWM input continues to indicate the "on" portion of the PWM cycle (PWM=1), and when a second clock signal is received (CLK=1). In the second "on" state 208 of the power stage switch, the power stage can provide charge to both the output capacitor 108 and to the output LED load 110. The power stage 102 output current ($I_{PS}$) need not be at zero at the beginning of the second "on" state 208 of the power stage switch.

Exit from the second "on" state 208 of the power stage switch can occur when the power stage current ($I_{PS}$) reaches a current threshold ($I_{PEAK}$)—which may or may not be the same value as the previous current threshold value, resulting in a fifth transition 209 to the second "off" state 205 of the power stage switch. Alternatively, exit from the second "on" state 208 of the power stage switch can follow a sixth transition 210 to the first "off" state 201 of the power stage switch, such as when the PWM input indicates the "off" time (PWM=0) of the PWM cycle. In an example, the sixth transition 210 need not depend on whether the power stage current ($I_{PS}$) has reached the current threshold ($I_{PEAK}$).

Figure 3:
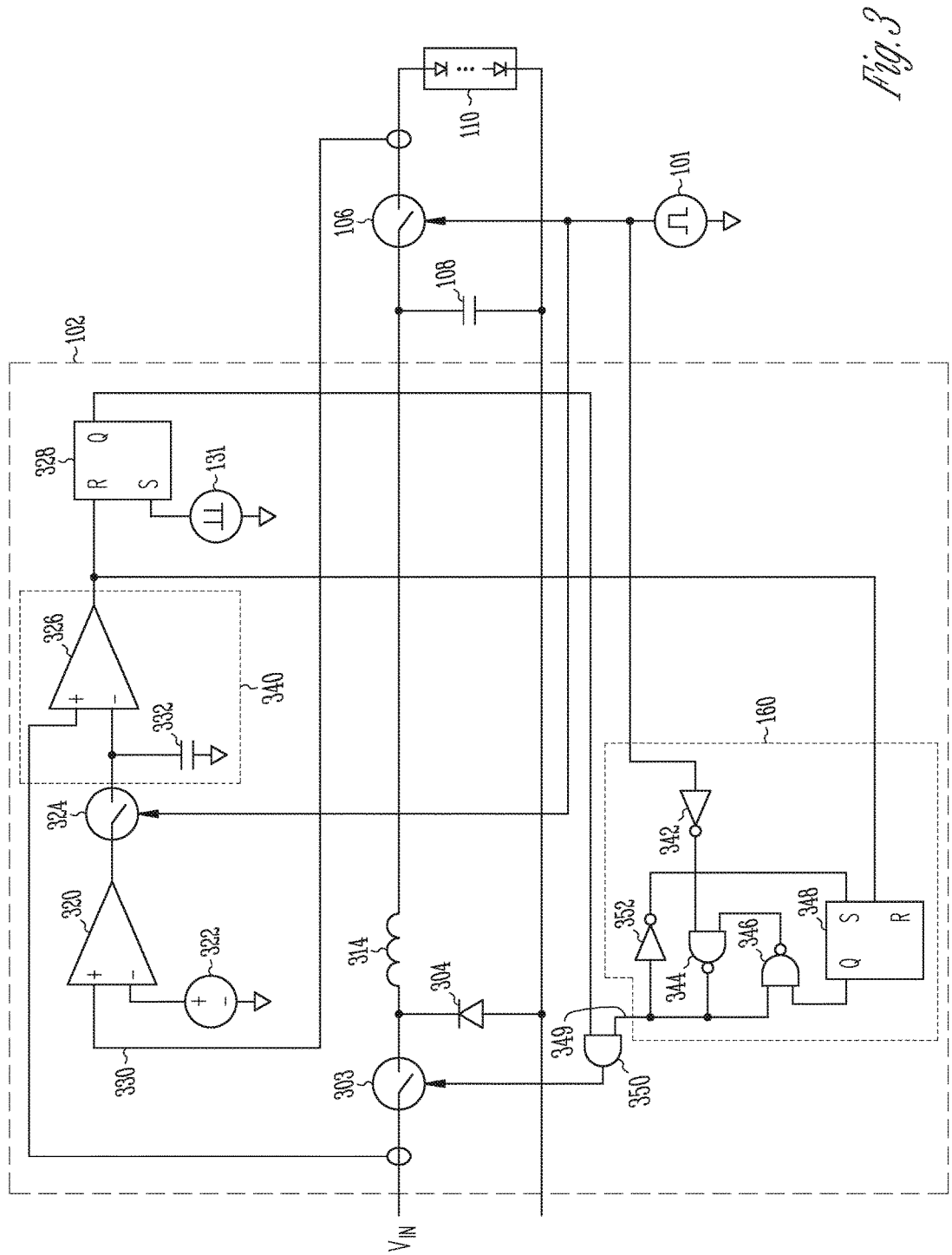
FIG. 3 illustrates generally an example of a system for providing controlled, low PWM dimming of an LED load.

FIG. 3 illustrates generally a portion of an example system 100 for permitting controlled, low PWM deep-dimming of an LED load 110. The system 100 can include a controller circuit 101, a power stage circuit 102, an output capacitor 108, and the LED load 110. The system 100 can be operated to provide an average current to the LED load 110 in accordance with a dimming set point of the controller 101. The average current can be provided by applying a pulse width modulated (PWM) current to the LED load 110. A brighter LED output can be accomplished by providing a longer "on" time of a PWM switch 106 during each PWM cycle. Conversely, a dimmer output can be accomplished by providing a shorter "on" time of the PWM switch 106 during the PWM cycle. The frequency of the PWM cycle can be fast enough such that an average observer's eye is incapable of discerning the on/off PWM cycling of the LED load 110.

The power stage 102 can include a switching regulator, which can include one or more power stage switches 303, 304, and an energy storage element such as an inductor 314. In certain examples, a diode can be substituted for the switch 304, such as shown in FIG. 3. A current feedback loop 330 can be included for operating the switching regulator. The one or more power stage switches 303, 304 can energize and de-energize the inductor 314. The output capacitor 108 can help smooth the output voltage as PWM current is provided to the LED load 110. The PWM switch 106 can be controlled by a PWM control circuit in the controller 101. The controller 101 can receive the dimming level set point and, in response, can vary the "on" time of the PWM switch 106 to control the current provided to the LED load 110. The controller 101 can include a low dimming circuit 160, such as can help allow for proper charge transfer and current control of the LED load 110 even when the PWM on-time becomes very short.

For nominal or no dimming, the "on" time of the PWM cycle can be relatively long, in which case the power stage switch 303 and the PWM switch 106 can both be closed in coordination or synchronization with a clock signal from a clock 131. The feedback loop 330 can include an error amplifier 320, such as to help adjust a peak current threshold of current through the inductor 314. The error amplifier 320 can compare the actual current of the LED load 110 to a desired LED current. The desired LED current can be established by a fixed or adjustable current reference source 322. The current output value of the current reference source 322 can be specified or fixed, such as to be at or near a rated limit of one or more of the components of the system 100. The output of the error amplifier 320 can be used to set a peak current threshold for the inductor current. A peak threshold capacitor 332 can hold a voltage representing the peak current threshold level, and can be disconnected from the error amplifier 320 when the PWM cycle is in an "off" state via a switch 324. The feedback loop 330 can include a peak current detector 340 that can further include a peak current comparator 326 to compare a signal representing the actual inductor current to a signal representing the peak current threshold. For longer PWM "on" times, the inductor current can increase to the peak current threshold, and a logic gate such as the peak detect latch 328 can reset the power stage switch 303 such that the current of the power stage 102 begins to decrease. If the "on" time of the PWM cycle remains active, upon receiving another clock pulse, the power stage switch 303 can again be set and current flow via the inductor 314 can again increase as the inductor 314 is energized. The switching cycle of the inductor 314 can continue to repeat until the "off" time of the PWM cycle begins.

When an initial "on" time of the PWM cycle is very short, the low dimming circuit 160 can change how the power stage switch 303 operates. For example, upon receiving a signal indicating a PWM "on" time, the power stage switch 303 can be clocked to energize the inductor 314, thereby increasing current flow through the inductor 314. The output of the peak detect latch 328 is set, and the output 349 of the low dimming circuit 160 is set. For each PWM switching cycle, the low dimming circuit 160 indicates whether the inductor current has reached the peak current threshold. For example, the output 349 of the low dimming circuit 160 initially becomes "high" at the beginning of each PWM "on" time to indicate that the inductor current has not yet reached the peak current threshold ($I_{PEAK}$) during the that PWM cycle. Since the output of the peak current latch 328 is high and the output of the low dimming circuit 160 are high, the output of an AND gate 350 of the system can operate to command the power stage switch 303 to be closed, or set for this example system 100.

Initially, the low dimming circuit 160 can operate to ignore the PWM signal transitioning to an "off" state of the PWM cycle until the inductor current ($I_{PS}$) reaches the peak current threshold ($I_{PEAK}$) at least for a first time. Thus, under a short "on" time period of the PWM cycle—for very low dimming intervals-additional current can provide additional charge to the output capacitor 108 even during the "off" time of the PWM cycle, such as to permit the desired average current established by the dimming set point to be delivered to the LED load 110. This desired average current can be established by allowing the power stage 102 to charge the output capacitor 108 outside the very short "on" time of the PWM cycle.

In an example, the low dimming circuit 160 can include a latch 348, a second latch including a first inverter 342, a first NAND gate 344, a second NAND gate 346, and a second inverter 352. The low dimming circuit 160 can include inputs to receive the PWM signal and the output of the peak current comparator 326. During "on" intervals of the PWM signal, the output 349 of the low dimming circuit 160 is set "high". The latch 348 can receive the output of the peak current comparator 326 at a Reset input. The output of latch 348 generally remains "high" until the output of the peak current comparator 326 indicates that the inductor current ($I_{PS}$) has reached the peak current threshold ($I_{PEAK}$). Upon receiving an indication that the current of the inductor ($I_{PS}$) has satisfied the peak current threshold ($I_{PEAK}$), the latch 348 of the output of the low dimming circuit 160 is released to a "low" state. The combination of the first NAND gate 344 and the second NAND gate 346 form another latch that allows the PWM signal to make the output of the first NAND gate 344 and the input of a control gate 350 "high" when the PWM signal is "high", but inhibits the PWM signal from making the output of the first NAND gate 344 and the input of a control gate 350 "low" when the PWM signal is "low", unless the output of the low dimming circuit 160 is already in a low state.

Figure 4:
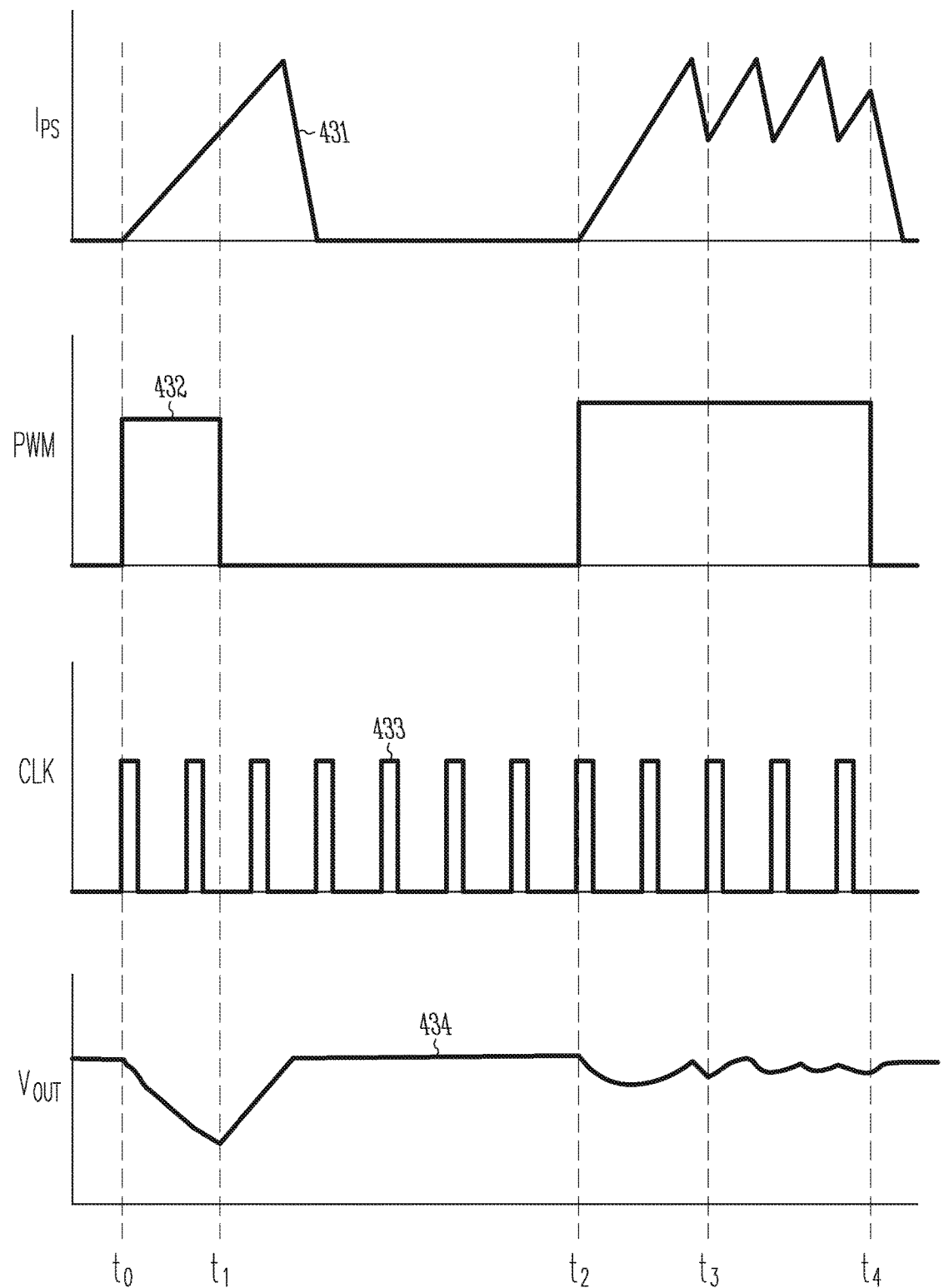
FIG. 4 illustrates generally waveforms associated with operating a system such as shown in FIG. 3 during a pulse-width modulation (PWM) cycle with a short "on" interval (e.g., very low dimming) and during a subsequent PWM cycle with a longer "on" interval.

FIG. 4 illustrates generally a conceptual example of waveforms associated with operating the system of FIG. 3 during a PWM cycle with a short "on" interval (e.g. very low dimming), and during a subsequent PWM cycle with a longer "on" interval. The waveforms shown in FIG. 4 illustrate conceptualized examples of the power stage current 431, the PWM signal 432, the switched mode power regulator clock signal 433, and the voltage 434 across the output capacitor 108. For short PWM "on" intervals (e.g., $t_0 \rightarrow t_1$ in FIG. 4), the inductor is allowed to be energized beyond the duration of the short PWM "on" interval, such as to allow enough energy to be transferred to the output capacitor 108 and to the LED load 110. This energy transfer can include energy transfer during the short PWM "on" time and additional energy transfer during the PWM "off" time. After the short PWM "on" time has concluded, the power stage switch can be operated to permit continued transfer of charge until a peak power stage current is reached. The extra current during the PWM "off" time can charge the voltage across the capacitor 108 such that if the next PWM "on" time is short, the initial voltage of the capacitor 108 can be at a sufficient level to allow the LED load 110 to be supplied with an average current commensurate with the dimming set point.

For longer PWM "on" intervals ($t_2 \rightarrow t_3$), the power stage switch can be cycled each time the power stage current reaches a peak current threshold and a next clock signal transition ($t_4$) is encountered. Once the power stage switch is operated so that the power stage current reaches the peak current threshold the first time, the power stage inductor is then no longer allowed to be energized beyond the end of the PWM "on" time. This can be accomplished by opening the power stage switch between the power stage inductor and the supply voltage. The power stage inductor may continue to supply current to the output capacitor 108 even after the power stage switch has been opened, to isolate the power stage inductor from the supply voltage.

Figure 5:
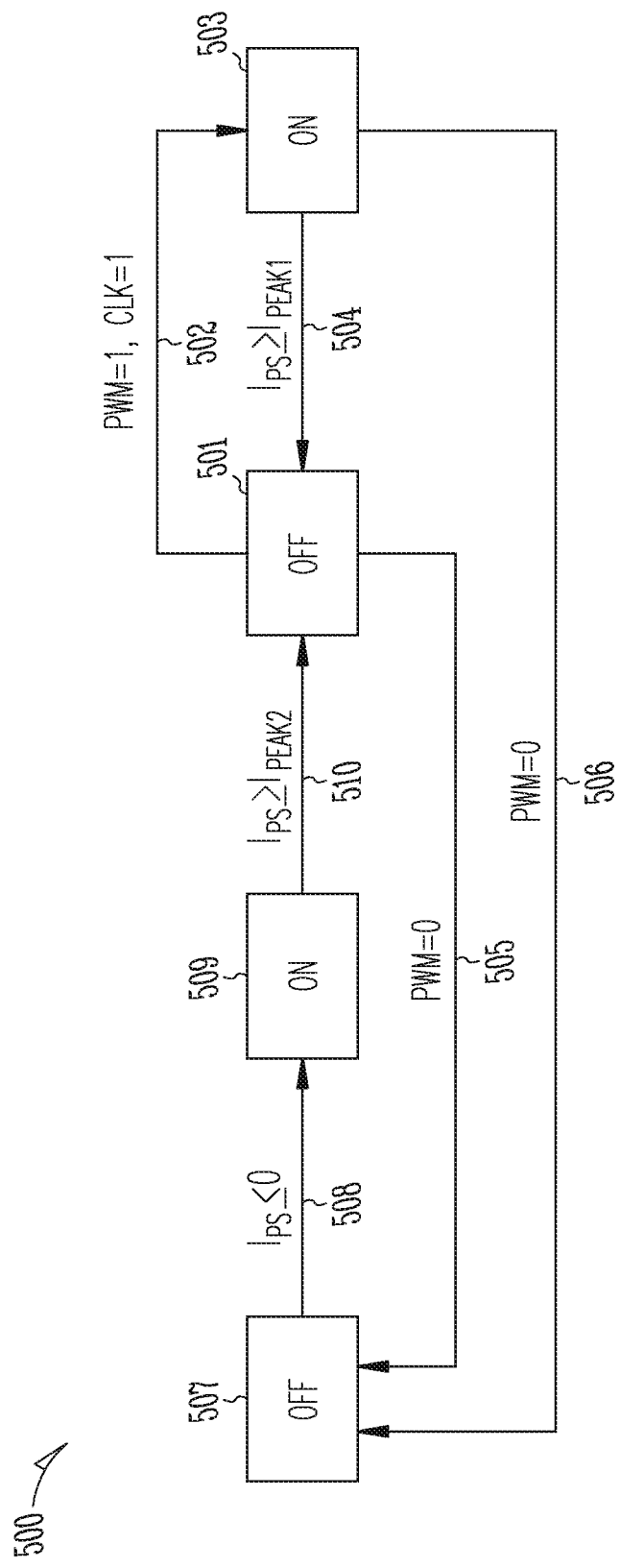
FIG. 5 illustrates generally a state diagram of an example of a method of extended charge transfer.

FIG. 5 illustrates generally a state diagram of an example of a method 500 of extended, or supplemental, charge transfer. The method 500 can be explained beginning at a first "off" state 501 of a power stage switch. A PWM input indicating a transition to an "on" time of a PWM cycle (PWM=1), can trigger a first state transition 502, such as to a first "on" state 503 of operating the power stage switch. The first state transition 502 can by synchronized with a clock of the switching power converter, in addition to being triggered by a transition to the "on" state of the PWM cycle. For example, a rising edge of a PWM "on" cycle (PWM=1) can be synchronized with a rising edge of a switching regulator clock signal to trigger the first state transition 502 to the first "on" state 503 of operating the power stage switch. The power switch can be included or arranged in a buck converter, a boost converter, a buck-boost converter, or other switching regulator configuration that can be included in the power stage 102. During the first "on" state 503, the power stage regulator can provide a charging current ($I_{PS}$) to an intermediate node, such as can be located at a terminal of the output capacitor 108. In the first "on" state 503, when the PWM switch 106 is closed, the power stage regulator can supply energy to both the output capacitor 108 and to the LED load 110. Initially, in the first "off" state 501, the power stage inductor current flow ($I_{PS}$) can be at zero and, upon the first state transition 502 to the first "on" state 503, the power stage inductor current can begin to increase. The first "on" state 503 can continue until a fixed or adjustable target or first peak power stage current threshold ($I_{PEAK1}$) has been satisfied.

Upon the power stage current ($I_{PS}$) satisfying the first peak threshold ($I_{PEAK1}$), together with the PWM cycle "on" time remaining active (PWM=1), a second state transition 504 can occur, such as to transition from the first "on" state 503 back to the first "off" state 501. Further similar first and second transitions 502, 504 between first "off" state 501 and the first "on" state 503 can occur as long as the PWM cycle "on" time remains active (PWM=1).

When the "on" time of the PWM cycle ends (PWM=0), a third transition 505 can occur, from the first "off" state 501, or a fourth transition 506 can occur, from the first "on" state 502, to a second "off" state 507. During the second "off" state 507, power stage inductor current ($I_{PS}$) can decrease as its charge is dumped to the output capacitor 108. Upon the power stage current falling to and reaching a valley threshold (e.g., $I_{PS}<=0$), a fifth transition 508 can occur, such as from the second "off" state 507 to a second "on" state 509. During the second "on" state 509 of the power stage switch, the power stage current ($I_{PS}$) can again increase as the power stage inductor is energized via the power stage switch (e.g., FIG. 6A or 6B, 303) of the power stage regulator. Then, when the increasing power stage current ($I_{PS}$) reaches a secondary peak threshold ($I_{PEAK2}$), a sixth state transition 510 can occur, such as from the second "on" state 509 to the first "off" state 501, in which switching operation of the power stage regulator is interrupted and idled. Upon receiving a next PWM input indicating a transition to a next PWM cycle "on" time (PWM=1) another first transition 502 from the first "off" state to the first "on" state can be triggered.

The method 500 as described using the state diagram of FIG. 5 can allow for very low dimming of an LED load 110, such as by supplementing charge transfer of very short PWM "on" cycle time intervals by providing additional charge transfer during a next PWM "off" time interval. For very short PWM "on" times, the charge transferred during the PWM "on" time may not be enough to meet the desired dimming set point, such that the LED load 110 can appear to flicker or be off instead of at the desired PWM dimmed level. However, the method 500 of providing supplemental charge transfer during the PWM "off" time interval, although not provided directly to the LED load 110, can be used to charge the output capacitor 108 to a voltage level that can allow for the average current to meet the desired dimming level, such as including during the next PWM "on" cycle.

Figure 6A:
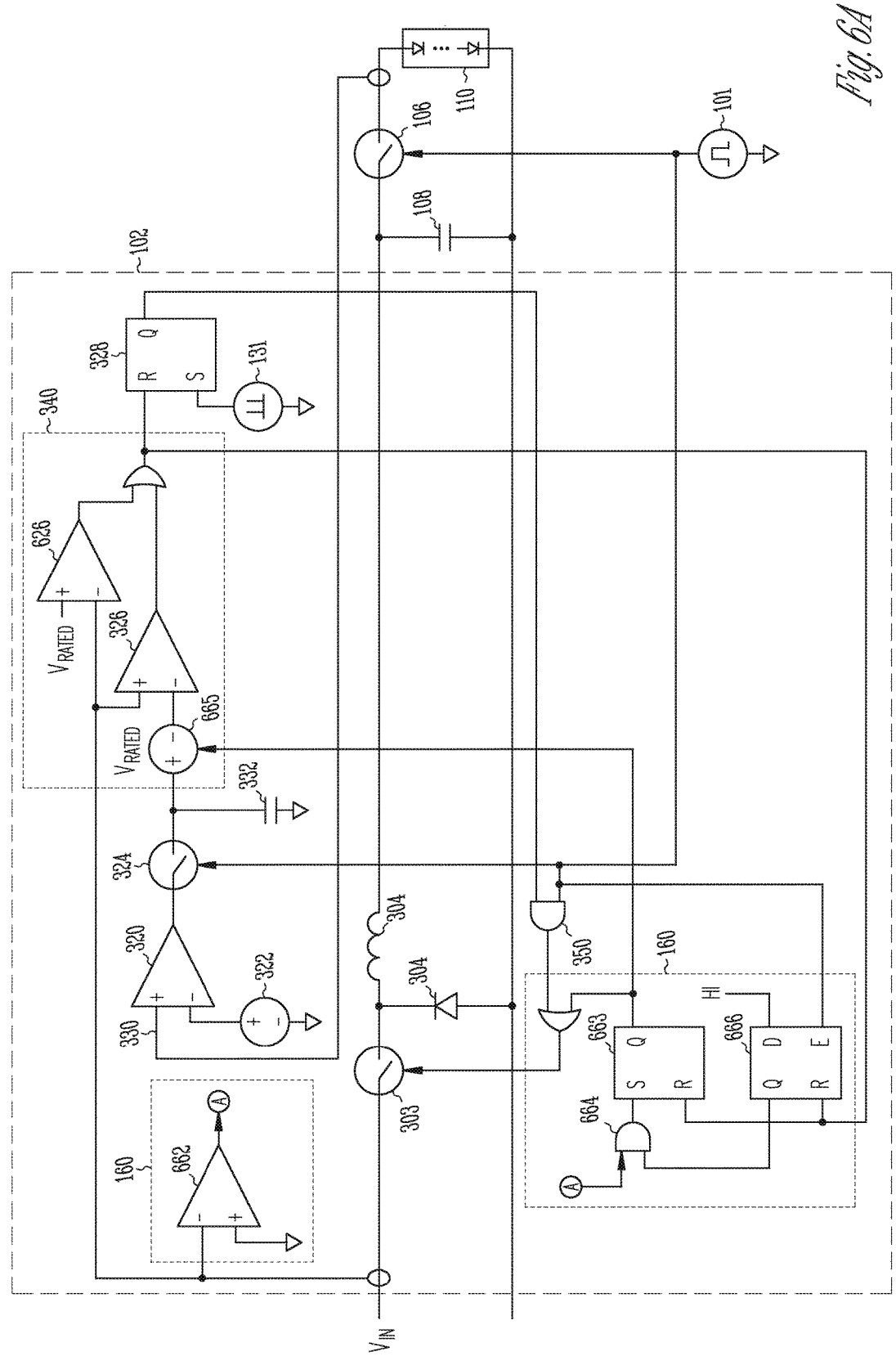
FIG. 6A illustrates generally an example of a system for providing controlled, low PWM dimming of an LED load.

FIG. 6A illustrates generally an example of portions of a system 100 for providing controlled, low PWM dimming of an LED load 110. The system 100 can include a controller 101, a power stage 102, an output capacitor 108, and can include or be coupled to the LED load 110. The system 100 can be operated to provide an average current to the LED load 110 commensurate with a dimming set point of the controller 101. The desired average current can be provided by applying a pulse width modulated (PWM) current to the LED load 110. A brighter LED light output can be provided by providing a longer PWM cycle "on" time of a PWM switch 106 during each PWM cycle. Conversely, a dimmer LED light output setting can be provided using a shorter PWM cycle "on" time of the PWM switch 106 during the PWM cycle. The frequency of the PWM cycle can be at a high enough frequency such that an average observer's eye need not detect the PWM on/off cycling of the LED load 110.

The power stage 102 can include a switching regulator, such as can include one or more power stage switches 303, 304 and an inductor 314. The inductor can be used to provide charge to the LED load 110 and to charge the output capacitor 108. The power stage 102 can include a current feedback loop 330, such as to help control switching of the switching regulator. The output capacitor 108 can help smooth the output voltage and current applied to the LED load 110. The system 100 can further include the PWM switch 106, such as to permit dimming of the LED load 110, and the controller 101 can include a PWM control circuit. The controller 101 can receive the dimming level set point and can vary the "on" time of the PWM switch 106 such as to control the current provided to the LED load 110. The controller 101 can include a low dimming circuit 160 such as can allow for proper charge transfer and current control of the LED load 110 even when the PWM on-time is very short.

For nominal or no dimming, the PWM cycle "on" time can be relatively long, and the closing of the power stage switch 303 and the closing of the PWM switch 106 to initiate the PWM "on" state can be coordinated or synchronized, such as can include using a clock signal, such as from a clock 131. The feedback loop 330 can include an error amplifier 320, such as can be used to adjust a peak current threshold of the inductor 314. The error amplifier 320 can compare the actual current of the LED load 110 to a desired LED current. The desired LED current can be established using a fixed or adjustable current reference source 322. The output of the current reference source 322 can be established such that the LED load current can be at or near a maximum rated current limit of one or more components of the system 100. The output of the error amplifier 320 can establish a peak current threshold value for the inductor current. A peak threshold capacitor 332 can be used to hold a voltage representative of the target peak current threshold level, and can be disconnected from the error amplifier 320 when the PWM cycle is in an "off" state via a switch 324. The feedback loop 330 can further include a peak current detector 340, such as can include a first peak current comparator 326 and a second peak current comparator 626. The second peak current comparator 626 can receive a comparison threshold ($V_{RATED}$) representative of a rated current limit of a power transfer component of the system 100, such as a maximum rated current limit of the inductor 314 or maximum rated current limit of the power stage switch 303. The first peak current comparator 326 can compare the actual inductor current ($I_{PS}$) to a target peak current threshold ($I_{PEAK}$), such as can have its threshold value adjusted by the error amplifier 320 and stored on the peak threshold capacitor 332.

In FIG. 6A, the system 100 can be operated such that the inductor current ($I_{PS}$) can increase to a lower of: (1) the rated peak threshold ($V_{RATED}$) or (2) the target peak current threshold ($I_{PEAK}$). A logic gate, such as the peak detect latch 328, can reset the switching on/switching off operating state of the power stage switch 303, such that the current ($I_{PS}$) of the power stage 102 begins to decrease upon such reset to the power stage switch "off" state. If the PWM cycle "on" time remains active, upon receiving another clock pulse, the power stage switch 303 can again be set to the power stage switch "on" stage, and the inductor 214 can again be energized, thereby increasing the inductor current flow ($I_{PS}$). The power stage current ($I_{PS}$) through the inductor 214 may continue to flow even in the power stage switch "off" state, using stored energy in the inductor, even before the inductor is re-energized using switching of the power stage switch 303 in the power stage switch "on" stage.

When the "on" time of the PWM cycle ends, and the "off" time of the PWM cycle begins, the low dimming circuit 160 can provide a secondary operating cycle of the power stage switch 303 during the "off" time of the PWM cycle. During the secondary operating cycle of the power stage switch 303, the output of a first latch 663 of the low dimming circuit 160 can activate a comparison using a voltage source 665 that can be selectively coupled between the peak threshold capacitor 332 and the inverting input of the first peak current comparator 326. The voltage source 665, when not activated, for example, via an output of a flip-flop 666 of the low dimming circuit 160, can provide a zero volt offset of the target peak threshold ($I_{PEAK}$) represented by the stored voltage on the peak threshold capacitor 332. When the voltage source 665 is activated, the offset voltage source 665 can subtract the rated peak threshold value ($V_{RATED}$) from the target peak threshold value ($I_{PEAK}$), such as to provide a voltage representative of a second peak threshold ($I_{PEAK2}$) for the secondary cycle of the power stage switch 303. For secondary cycles in which the target peak threshold ($I_{PEAK}$) is at or less than the rated peak threshold ($V_{RATED}$), the second peak threshold ($I_{PEAK2}$) can be set to a minimum default value. The sum of the charge provided by the initial primary power stage switch cycle and that of the secondary power stage switch cycle, can be established so as to provide an average current commensurate with the level of the deep dimming set point over a full PWM cycle with a very short PWM cycle "on" time.

After the PWM "on" time concludes, the low dimming circuit 160 can monitor the power stage current ($I_{PS}$) being provided to the output capacitor 108. Upon the power stage current ($I_{PS}$) falling to reach a low current threshold value, a current valley/trough comparator 662 of the low dimming circuit 160 can trigger the secondary cycle of the power stage switch 303. For example, when the PWM "on" time ends, the output of a gate 350 in the feedback loop 330 can go "low", allowing the power stage switch 303 to cease energizing the inductor to increase the power stage current ($I_{PS}$) of the power stage 102. The valley current detector 662 can compare the power stage current ($I_{PS}$) of the inductor 314 to a valley threshold. When the power stage current of the inductor 314 falls to or below the valley threshold value, the output of the valley current comparator 662 can go "high" in response. The first latch 663 of the low dimming circuit 160 can receive the output of the valley current comparator 662, such as through a second gate 664 of the low dimming circuit 160. The output of the valley current comparator 662 can be used to trigger the power stage switch 303 to close for the secondary cycle. During the secondary cycle, the output of the first latch 663 can activate an offset voltage circuit 665 to modify the target peak threshold ($I_{PEAK}$) held across the peak threshold capacitor 232, such as to subtract the offset to establish a lower value, to establish a second peak threshold ($I_{PEAK2}$). When the power stage current ($I_{PS}$) increases enough to meet the second peak threshold ($I_{PEAK2}$), the first latch 663 of the low dimming circuit 160 can open the power stage switch 303, and deactivate the offset voltage circuit 665. The switching cycle of the inductor 314 can resume when the "on" time of the next PWM cycle begins.

Figure 6B:
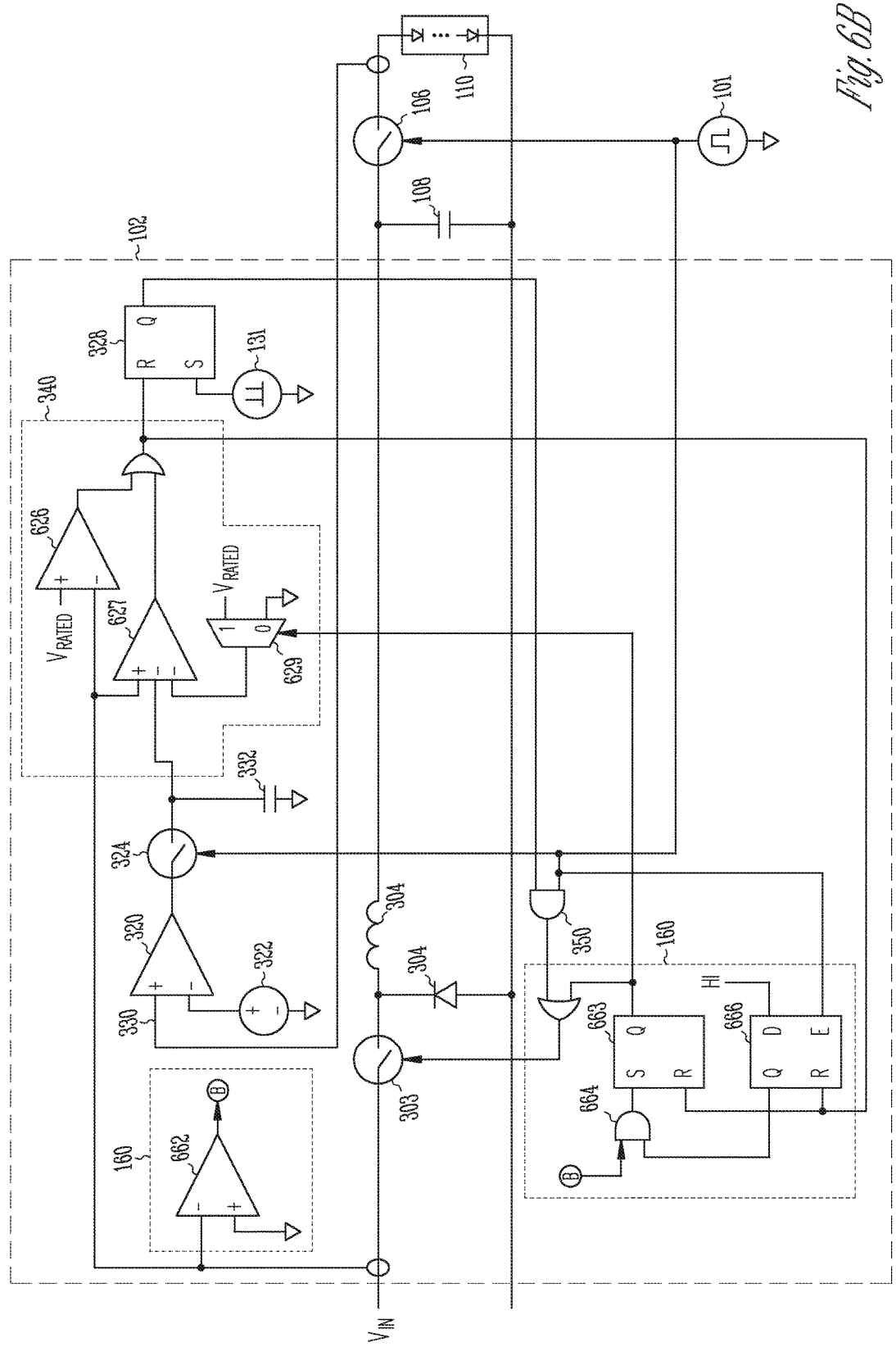
FIG. 6B illustrates generally an example of logic for a peak current detector of a system for providing controlled, low PWM dimming of an LED load.

FIG. 6B illustrates generally another example of logic for the peak current detector 340. The example FIG. 6B can include a first peak detector 627, a second peak current detector 626, a logic gate 328, and a multiplexer 629. The second peak current comparator 626 can receive a comparison threshold value that can represent a rated current limit of a power transfer component of the system 600, such as a maximum rated current limit of the inductor 314 or a maximum rated current limit of the power stage switch 303, and can compare the actual current of the power stage 102 to the threshold value. The first peak current comparator 627 can compare an input value to a sum of two thresholds. Of these two thresholds, a first threshold can be a target peak current threshold, adjusted by the error amplifier 320 and stored on the peak threshold capacitor 332, and a second threshold can be provided by the multiplexer 629. During a first "on" time of the power stage switch 30—during an "on" time of the PWM cycle—the multiplexer 629 can provide a zero offset as the second threshold to the first peak current comparator 626. During a second "on" time of the power switch 203—during the "off" time of the PWM cycle—the multiplexer 629 can provide the threshold representative of a rated current limit of a power transfer component of the system 100 as the second threshold to the first peak current comparator 626. An output of the second flip flop can be used to control the multiplexer 629.

Figure 7:
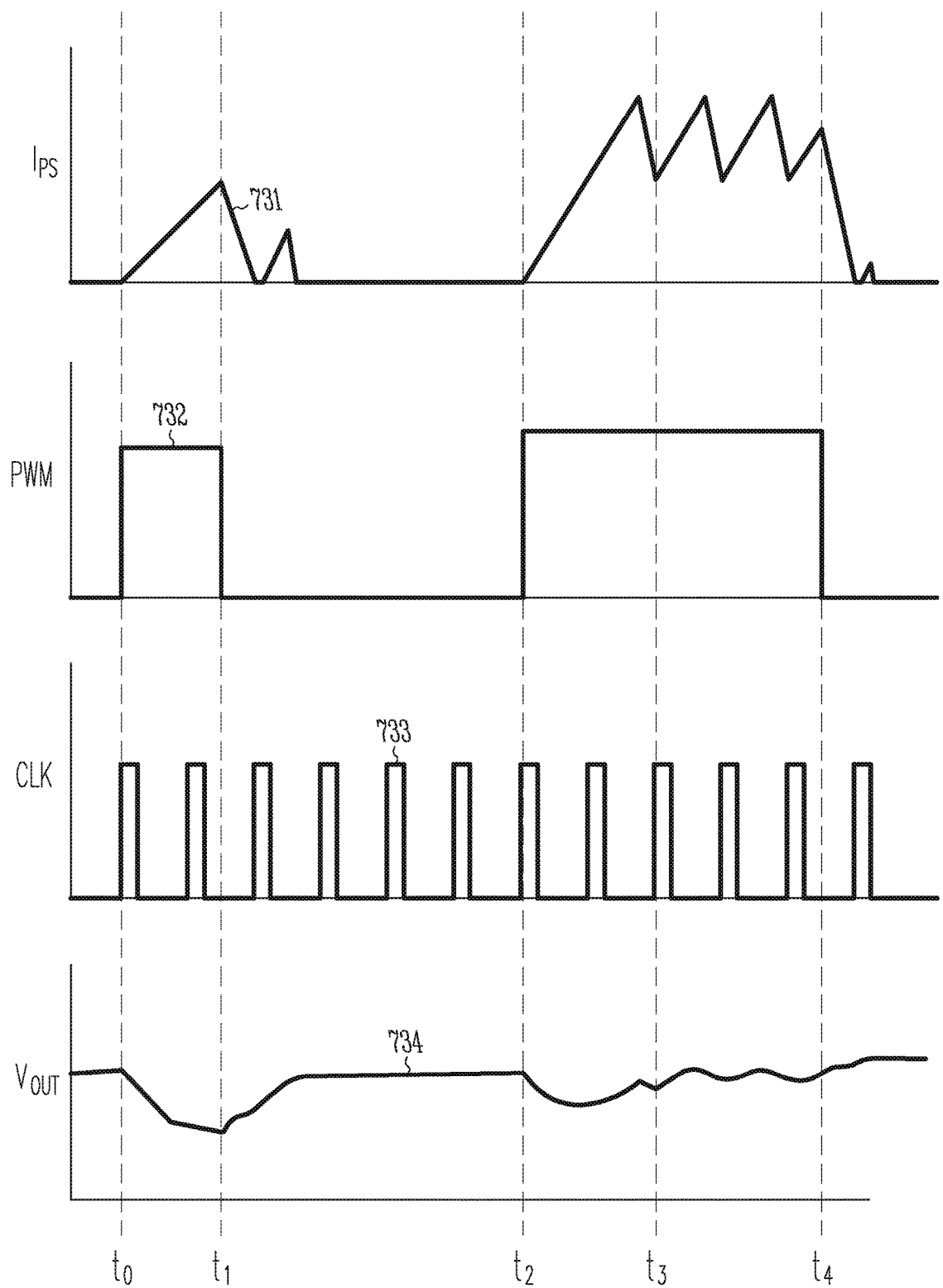
FIG. 7 illustrates generally waveforms associated with operating a system such as shown in FIGS. 6A and 6B during a PWM cycle with a short "on" interval (e.g., very low dimming) and a subsequent PWM cycle with a longer "on" interval.

FIG. 7 illustrates generally an example of particular waveforms associated with operating the systems of FIG. 6A or 6B, such as during a PWM cycle with a short "on" interval (e.g. very low dimming) and a subsequent PWM cycle with a longer "on" interval. The waveforms shown include the power stage current 731, the PWM signal 732, the clock signal 733 for use in the switching regulator of the power stage 102, and the voltage 734 across the output capacitor 108. For short PWM "on" intervals, the inductor can be allowed to be energized for the duration of the short PWM "on" interval. For very short PWM "on" times, the power stage 102 may not transfer enough charge during the very short PWM "on" time to meet the energy needed for the desired light intensity dimming of the LED load 110. Therefore, after the short PWM "on" time has concluded, dimming control logic can wait for the power stage current to fall and reach a valley threshold, and can control a second cycle of the power switch during the PWM "off" time. A magnitude of a secondary peak threshold of the second power switch cycle can be determined, for example, based on the length of one or more prior PWM "on" times, or based on the actual dimming set point. The power stage inductor can be energized using the power stage switch until the power stage current through the inductor increases to and reaches the secondary peak threshold. The extra current of this second cycle can help charge the output capacitor 108, such that the voltage across the output capacitor 108 at the next PWM "on" time can be at a sufficient level to allow the LED load 110 to be provided with an average current commensurate with the dimming set point.

For longer PWM "on" intervals, the power stage switch can be cycled each time the power stage current reaches a peak current threshold. At the end of such longer PWM "on" times, the power stage inductor de-energizes while the power stage current can continue to provide current to the output capacitor 108. After such longer PWM "on" time has concluded, dimming control logic can wait for the power stage current to fall to and reach a valley threshold. Then, the dimming control logic can control a fractional or other second cycle of the power switch, such as for a short default duration during the PWM "off" time. For longer PWM "on" times, the second cycle of the power switch during the PWM "off" time may not be desired or may provide a negligible effect. Additional dimming logic can optionally be included, such as to inhibit the second cycle of the power switch after a longer PWM "on" time.

Figure 8:
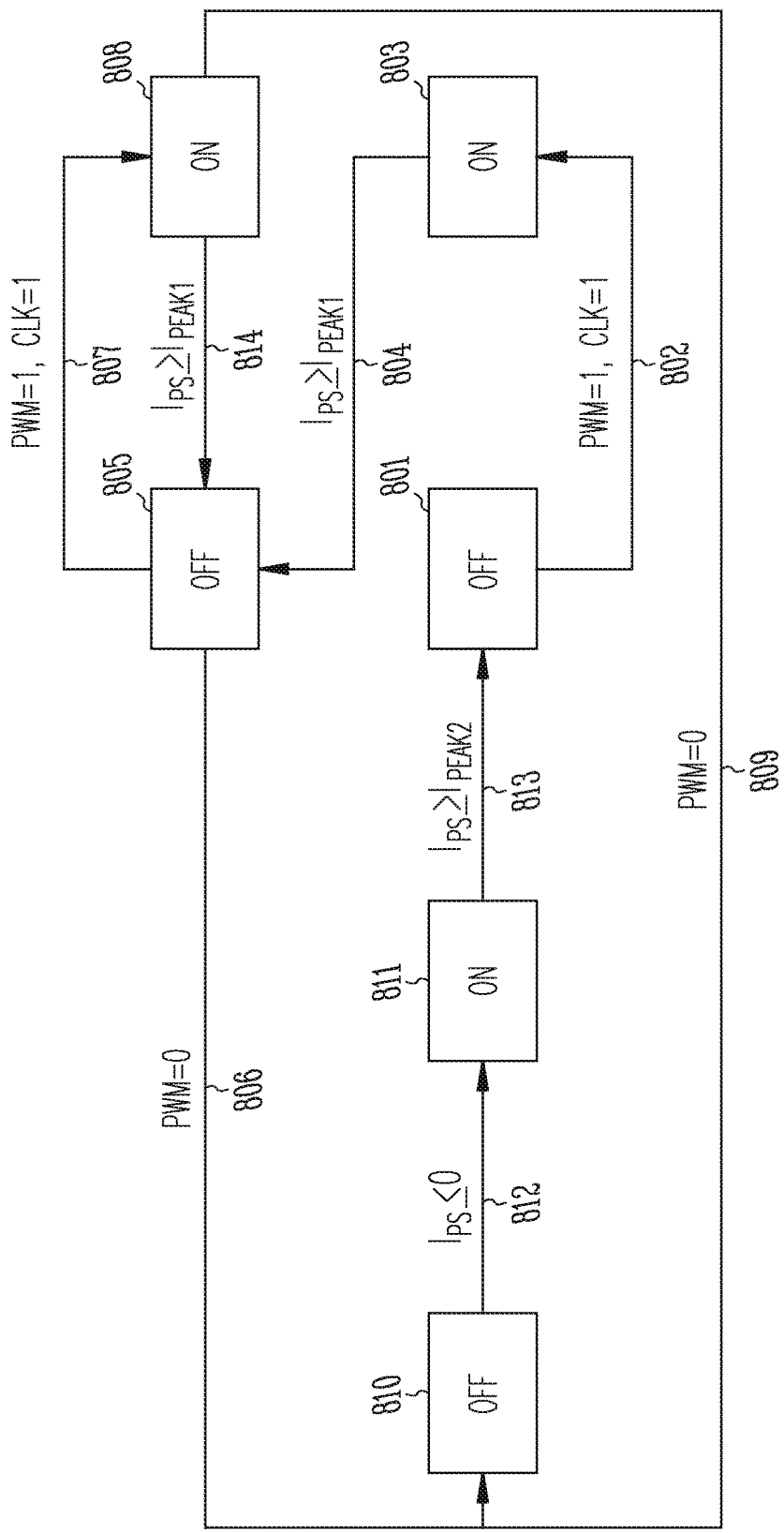
FIG. 8 illustrates generally a state diagram of a method of an example of a combination system.

FIG. 8 illustrates generally a state diagram of an example of a method of operating a system using a combination of the dimming circuit 160 of FIG. 3 and the low dimming circuit 160 of FIGS. 6A and 6B. The method can be explained beginning at a first "off" state 801 of a power stage switch. A first state transition 802 from the first "off" state 801 to the first "on" state 803 of the power stage switch can occur upon receiving a PWM input indicating a transition to a PWM "on" time (PWM=1) of a PWM cycle, such as synchronized with a rising edge of a clock (CLK=1) of a switching regulator of the power stage. The switch and the switching regulator of the power stage can be configured as a buck converter, a boost converter, a buck-boost converter, or other configuration. During the first "on" state 803 of the power stage switch, the switching regulator can supply charge to an intermediate node of an LED circuit, such as at the output capacitor 108, which, in turn, can be coupled to the LED load 110 via the PWM switch 106. When the PWM switch is closed, the switching regulator can supply both the output capacitor 108 and the LED load 110. Initially, at the first "off" state 801 of the power stage switch, the current flow ($I_{PS}$) through an inductor of the power stage can start at zero and can then increase. Operation can continue in the first "on" state 803 of the power stage switch until a target current threshold ($I_{PEAK1}$) has been satisfied by the power stage current ($I_{PS}$), e.g., regardless of whether the PWM "on" time of the PWM cycle has expired.

At 804, a second state transition can occur from the first "on" state 803 of the power stage switch to a second "off" state of the power stage switch, such as when the actual power stage current flow ($I_{PS}$) has satisfied the current threshold ($I_{PEAK1}$). During the second "off" state 805 of the power stage switch, a power supply path of the power stage can be interrupted. However, energy stored within the power stage inductor can still provide current to charge the output capacitor 108 and, possibly, to the LED load 110 via the PWM switch 106. The current flow while operating in the second "off" state 805 generally decreases.

At 807, a third state transition from the second "off" state 805 to a second "on" state 808 of the power stage switch can occur, such as when the PWM input continues to indicate the PWM "on" time (PWM=1) of the PWM cycle, and a second clock signal (CLK=1) is received. In the second "on" state 808 of the power stage switch, the switching regulator of the power stage can supply charge to the output capacitor 108 and to the output LED load 110 via the PWM switch 106. The current from the output of the power stage need not be at zero at the beginning of the second "on" state 808 of the power stage switch.

At 814, if the PWM "on" time of the PWM cycle remains active, and the power stage current meets the peak threshold ($I_{PEAK1}$), a fourth state transition 814 can occur, returning operation back to the second "off" state 805. As long as the "on" time of the PWM cycle remains active (PWM=1), operation can loop between the second "off" state 805 and the second "on" state 808.

At either the second "off" state 805 or the second "on" state 808, of the power stage switch, operation can follow a fifth state transition 806, or a sixth state transition 809, respectively, to a third "off" state 810, such as when the PWM cycle enters a PWM "off" state (PWM=–0). During the third "off" state 810 of the power stage switch, power stage current ($I_{PS}$) can decrease as charge is dumped to the output capacitor 108 from the power stage inductor.

At 812, upon the power stage inductor current falling to and reaching a valley threshold value, e.g., such as zero, the method 800 can undergo a seventh state transition 812 to a third "on" state 811 of the power stage switch. During the third "on" state 811 of the power stage switch, the power stage inductor can again be energized.

At 813, when the power stage inductor current increases to and reaches a secondary peak threshold ($I_{PEAK2}$), an eighth state transition 813 can occur, from the third "on" state 812 of the power stage switch to the first "off" state 801 of the power stage switch. Upon receiving another PWM input (PWM=1) indicating a transition to a PWM "on" time of a subsequent PWM cycle, the method 800 can continue, such as by repeating in the manner described above.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A pulse-width modulation (PWM) method of driving an LED to allow dimming while reducing or avoiding flicker, including using a first signal to control a first switch for discharging of an intermediate node through the LED, and using a second signal to control a second switch for charging of the intermediate node, the method comprising:
    recurrently performing the steps of:
    (a) in response to the first signal starting a cycle for discharging the intermediate node through the LED, triggering the second signal to start a first switch cycle for charging of the intermediate node until a first target value is met;
    (b) triggering the second signal to end the first switch cycle for charging the intermediate node when the first target value is met or when the first signal ends the cycle for discharging the intermediate node regardless of whether the first target value is met; and
    (c) in response to the same cycle for discharging the intermediate node has ending, triggering the second signal to start a fractional switch cycle for charging the intermediate node until a second target value is met, thereby triggering a return to performing step (a).

2. The method of claim 1, wherein the second target value is lower in magnitude than the first target value.

3. The method of claim 1, including comparing an inductor current of an inductor used to charge the intermediate node to at least one of the first target value or the second target value, the inductor energized via the second switch controlled by the second signal.

4. The method of claim 1, wherein the first target value is either a peak current value indicative of a level of charge to satisfy a dimming set point or a current value indicative of a maximum current rating of a component coupled to the intermediate node.

5. The method of claim 4, including subtracting the current value indicative of a maximum current rating of a component coupled to the intermediate node from the peak current value indicative of a minimum level of charge to satisfy a dimming set point to provide the second target value.

6. The method of claim 5, including limiting the second target value to maintain at least a specified minimum positive value.

7. A method of driving a light-emitting diode (LED), the method comprising:
    during an "on" interval of a first switch cycle of an LED, energizing an inductor and also initiating current of the LED, wherein the LED is coupled to the inductor via a first switch during the "on" interval:
    when transitioning to an "off" interval of the first switch cycle, interrupting current to the LED using the first switch and interrupting energizing of the inductor;
    de-energizing the inductor via an output capacitor during the "off" interval of the first switch cycle; and
    energizing the inductor during the "off" interval of the first switch cycle until a secondary target current is met during the "off" interval of the first switch cycle and before a beginning of an "on" interval of a second switch cycle.

8. The method of claim 7, including receiving a dimming set point for the LED; and
    wherein a sum of a first charge provided to the LED during the "on" interval and a second charge provided using the secondary target current is indicative of an average current of the first switch cycle that meets the dimming set point.

9. The method of claim 8, including comparing a current of the inductor to a primary target current during the "on" interval of the first switch.

10. The method of claim 9, including interrupting energizing of the inductor when the current of the inductor during the "on" interval of the first switch is greater than the primary target current.

11. The method of claim 9, wherein the primary target current is indicative of a minimum level of charge provided to the LED during the "on" interval of the first switch to satisfy the dimming set point of the LED.

12. The method of claim 9, wherein the primary target current is indicative of a maximum current rating of the inductor or a second switch configured to couple and decouple the LED to the inductor.

13. The method of claim 12, including subtracting a current indicative of a maximum current rating of the inductor or the second switch from a current indicative of the minimum level of charge to provide the secondary target current.

14. A method of dimming a light-emitting diode (LED) using a regulator that is selectively coupled to the LED, the method comprising:
    energizing an inductor of the regulator, using a first "on" state of a power switch of the regulator, with a supply voltage together with coupling the LED to an output of the regulator via an "on" state of a pulse-width modulation (PWM) switch;
    isolating the inductor from the supply voltage by initiating an "off" state of the power switch together with initiating isolating the LED from the output of the regulator using a first "off" state of the PWM switch; and
    re-energizing the inductor using a second "on" state of the power switch during the first "off" state of the PWM switch until current of the inductor reaches a first threshold.

15. The method of claim 14, including comparing a current of the inductor to a second threshold during the "on" state of the power switch.

16. The method of claim 15, including interrupting energizing of the inductor when the current of the inductor during the "on" state of the power switch is greater than the second threshold.

17. The method of claim 15, wherein the second threshold is indicative of a minimum level of charge provided to the LED during the "on" state of the PWM switch to satisfy a dimming set point of the LED.

18. The method of claim 15, wherein the second threshold is indicative of a maximum current rating of the inductor or the PWM switch.

19. The method of claim 18, including subtracting a current indicative of the maximum current rating of the inductor or the PWM switch from a current indicative of the minimum level of charge to provide the first threshold.

20. A low dimming circuit for a pulse-width modulation (PWM) light-emitting diode (LED) driver, the low dimming circuit comprising:
    a target current detector configured to provide an output indicative of a target current of a power stage of the PWM driver; and a control circuit configured to receive a PWM signal of the PWM LED driver, to control a first transition to a first "on" state of a power switch of the power stage during an on-interval of a first PWM cycle of the PWM signal, and to control a second transition to the first "on" state of the power switch using the output of the target current detector during an off interval of the first PWM cycle.

21. The low dimming circuit of claim 20, wherein the control circuit includes a first latch circuit configured to control a transition of the power switch from the first "on" state to a second state after the second transition.

22. The low dimming circuit of claim 21, wherein the control circuit includes a second latch circuit configured to trigger the second transition when the output of the target current detector indicates that current of the power stage has fallen below the target current and the first latch circuit has been asserted.

23. The low dimming circuit of claim 22, including a logic gate configured to receive the PWM signal and the output of the second latch circuit and to provide a control signal to the power switch when the PWM signal or the output of the second latch circuit is asserted.

24. The low dimming circuit of claim 22, wherein a Reset input of the first latch circuit and a Reset input of the second latch circuit are each configured to be coupled with an output of a current comparator of the PWM LED driver.

\* \* \* \* \*